Aug. 11, 1942.  S. G. MARGLES  2,292,534
MOVING STAIRWAY STEP CONSTRUCTION
Filed Sept. 4, 1941  2 Sheets-Sheet 1
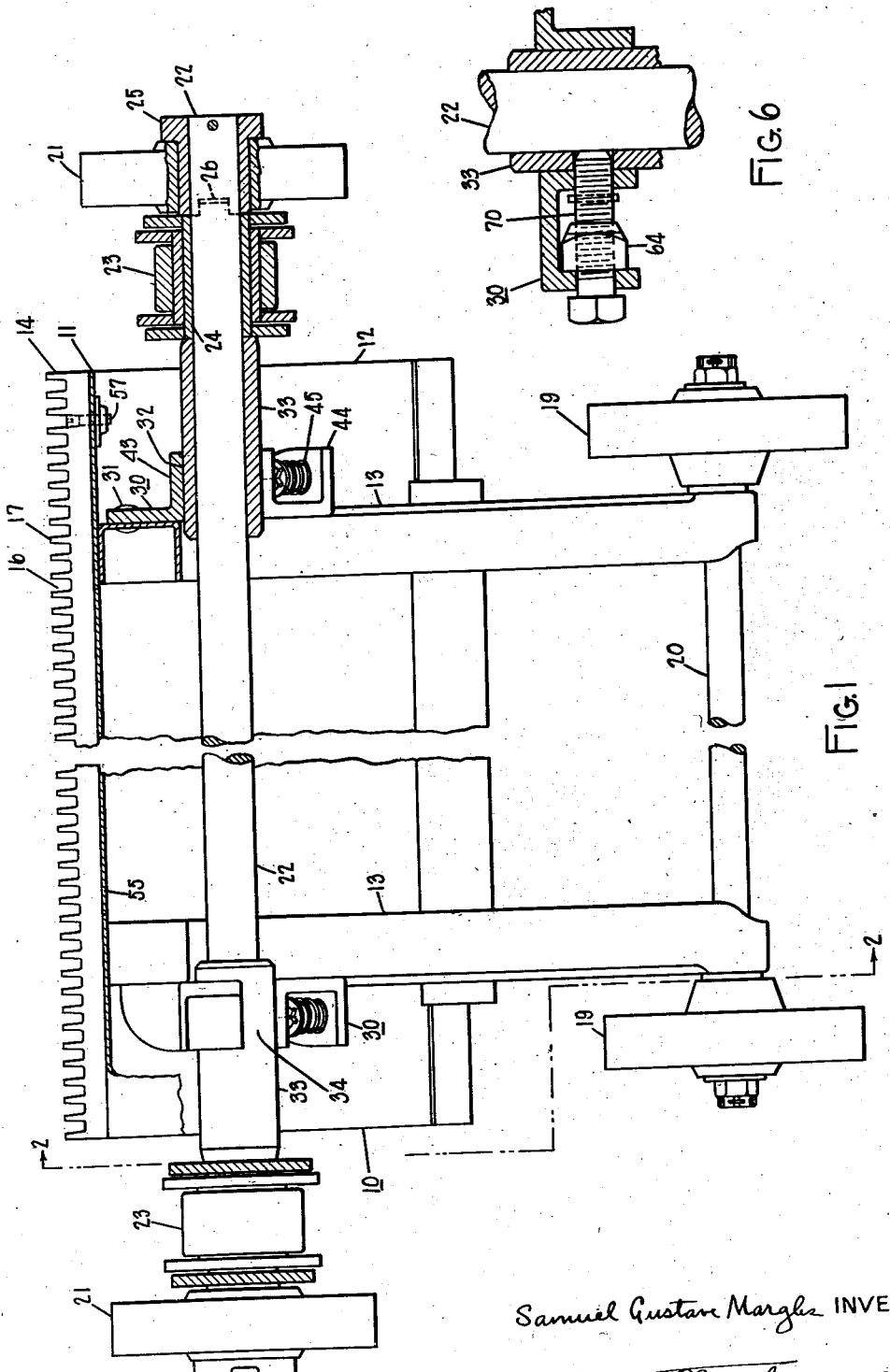
Samuel Gustave Margles INVENTOR
BY Walter E. Bradley ATTORNEY

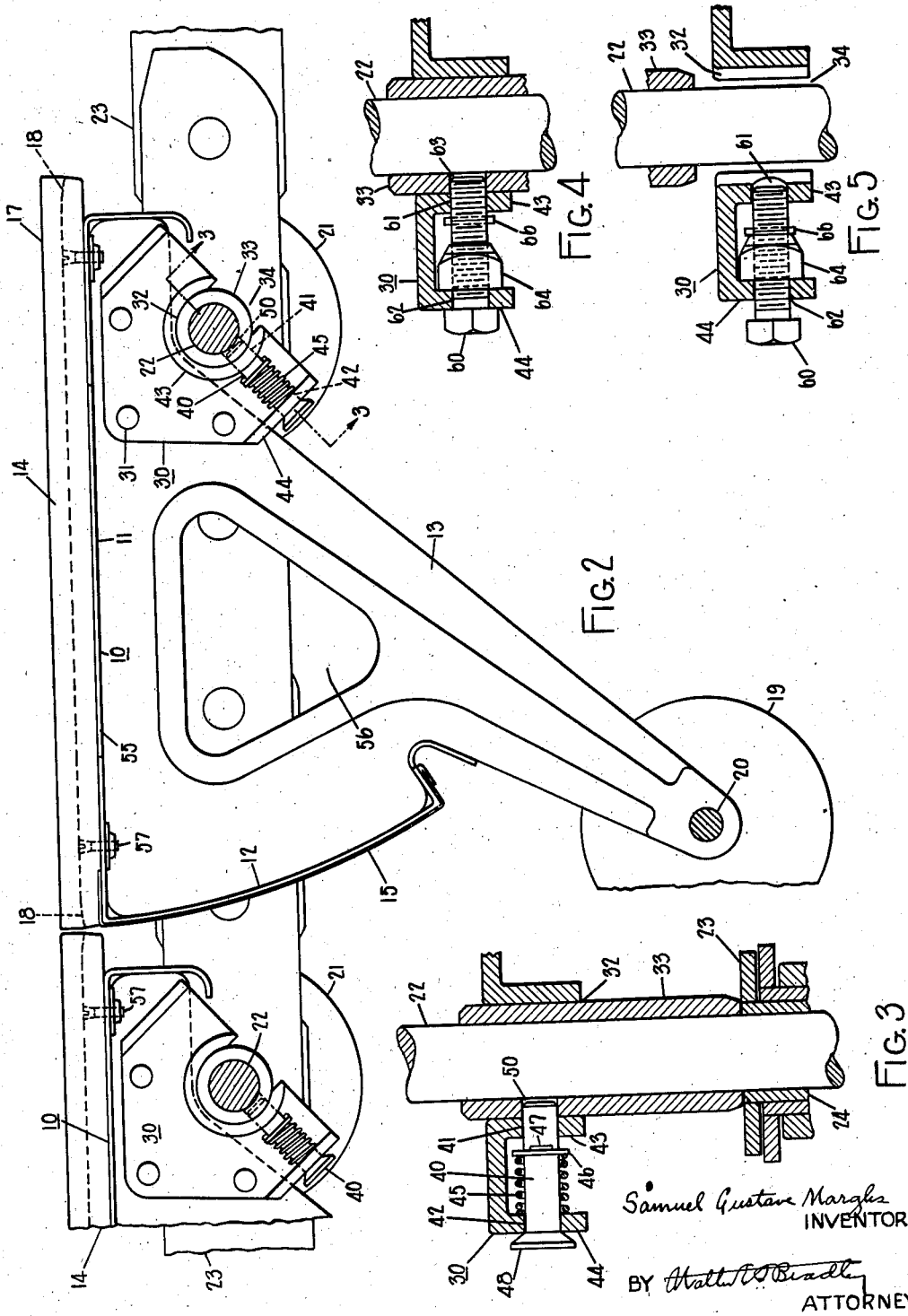

Patented Aug. 11, 1942

2,292,534

UNITED STATES PATENT OFFICE 2,292,534

MOVING STAIRWAY STEP CONSTRUCTION

Samuel Gustave Margles, Brooklyn, N. Y., assignor to Otis Elevator Company, New York, N. Y., a corporation of New Jersey Application September 4, 1941, Serial No. 409,484

4 Claims. (Cl. 198—16)

The invention relates to moving stairways, especially the construction of the steps of moving stairways.

Moving stairways comprise an endless series of steps which move from one landing to another for the purpose of conveying passengers. The steps are connected together by sprocket chains, known as running gear chains. It has been the practice for a considerable number of years to provide running gear chains at the sides of the stairway driven by sprockets at the upper end of the stairway. The steps are supported on wheels which run on tracks on each side of the stairway. Two of the wheels are associated with the running gear chains and are known as chain wheels. The other wheels are carried by the step frame and are called trailer wheels. The chain wheels are rotatably mounted on the ends of a step axle which extends through the running gear chains. The step frame is supported on the step axle, being provided with bushings through which the step axle extends and in which the axle may turn. It is desirable that the step frames may be readily assembled on the step axles. Also because of replacements or repairs, it is desirable that the step frames may be readily removed from their step axles and readily put back or replaced.

The object of the invention is to provide a simple mounting for step frames on step axles which enables the frames to be readily installed on the axles and removed therefrom.

The invention involves securing the step frames to the axles by retractable fasteners carried by the frames and which are retained with the frames when in retracted positions.

In carrying out the invention in accordance with an arrangement which will be described, each step axle is mounted in bushings, one on each side of the step frame. These bushings are slidably mounted in apertures provided therefor in brackets secured to the sides of the step frame. In each bracket leading from the edge to the bushing aperture is an opening or slot of a width slightly greater than the diameter of the step axle but less than the diameter of the bushing. To install the frame on the axle, the bushings are slid aside on the axle and the frame is placed in position with the axle in the bushing apertures, entering through the openings leading to the apertures. The bushings are then slid into the apertures. A spring pressed pin is provided on the step frame for each bushing and the bushing is provided with an aperture to receive the end of the pin. In inserting the bushing, it is turned until the pin springs into the aperture in the bushing, locking the bushing in place. To remove the step frame, the pins are drawn out of the bushing apertures against the force of their springs and the bushings pushed aside which frees the step frame, permitting it to be lifted off the axle.

In another embodiment which will be described a bolt is used instead of the spring pressed pin. The bolt is slidable into the aperture in the bushing and is provided with a nut which is held against turning to enable the bolt to be locked in bushing retaining position or to be released by turning to enable the step to be removed.

A general idea of the invention, modes of carrying it out, and various features and advantages thereof will be gained from the above statements. Other features and advantages of the invention will be apparent from the following description and appended claims.

In the drawings:

Figure 1 is a rear view with parts in section of a moving stairway step embodying the invention;

Figure 2 is a view taken along the line 2—2 of Figure 1, along with a portion of another step, parts being broken away;

Figure 3 is a fragmental detail in section taken along the line 3—3 of Figure 2;

Figure 4 is a fragmental detail similar to Figure 3, but illustrating another embodiment of the invention;

Figure 5 is a view similar to Figure 4 but with the bushing removed from the step frame; and Figure 6 is a view of an arrangement similar to that of Figure 4 but with the step axle clamped to the step frame.

Referring to Figures 1 to 3 inclusive, the step frame comprises a plate 10 bent to form a tread portion 11 and a curved riser 12 and side members 13. The side members are punched out to provide a flanged construction conforming to the contour of the plate 10 and are secured to the tread and riser as by plug welding. These side members provide a stiff frame construction and enable minimizing the clearance between the riser and the edge of the adjacent step. Upon the tread portion of the frame is mounted a tread plate 14, while the riser is provided with a facing 15. The tread plate is provided with a plurality of longitudinally extending grooves 16 to form cleats 17 for meshing with the teeth of the combplates at the ends of the stairway. The ends 18 of the bottoms of the grooves are sloped downwardly so that those in the direction of travel of the step may be engaged by the combplate teeth to force the step beneath the combplate and thus prevent jamming should the leading edge of the step be too high.

The step is provided on each side with a trailer wheel 19 at the lower end of the side member 13. These wheels are rotatably mounted on a shaft 20 extending between the side members. A chain wheel 21 is also provided for each side of this step. The chain wheels are mounted on an axle 22 extending across the stairway through opposite links in the running gear chains 23, the chain wheels being outside the links of the chain. Each chain at the point where the chain wheel axle extends through the chain is provided with a bushing 24 to receive the axle, this bushing having a pressed fit in apertures formed in the outer links of the chain. At each end of the axle is a flanged sleeve 25 pinned to the axle, the chain wheel rotating on the sleeve. A lug and slot connection 26 is provided, preferably only on one side of the step, between bushing 24 and sleeve 25 to prevent rotation of the step axle with the chain wheel.

The step frame is supported on the chain wheel axle. For this purpose each side member 13 is provided with a bracket 30 secured to the side member as by rivets 31. This bracket is provided with a flanged aperture 32 to receive an elongated bushing 33 for the step axle. Leading into the aperture from the edge of the bracket is a slot 34 of a width great enough to pass the step axle but less than the diameter of the bushing. To mount the frame on the axle the bushings are slid inwardly of the axle so as to clear the brackets and the step frame is placed in position with the step axle in the apertures 32, the axle entering the apertures through the slots 34. The bushings are then slid outwardly into the bushing apertures up to the chains, the ends of the bushings being tapered to facilitate this operation.

To retain the bushing in position, each bracket is provided with a pin 40 which extends through aligned apertures 41 and 42, respectively in the flange 43 for aperture 32 and an additional flange 44 formed on the bracket. A compression spring 45 is provided on the pin, extending between flange 44 and a washer 46 abutting a cotter pin 47 in the pin. A tapered head 48 is provided on the pin which is pulled on to withdraw the pin against the force of the spring. An aperture 50 is provided in the bushing to receive the end of the pin, the pin being biased to extend into this aperture by spring 45.

When inserting the bushing into aperture 32, it is turned around until the aperture 50 comes opposite the pin whereupon the pin springs into place. The end of the pin is beveled to facilitate its entrance into the aperture. When it is desired to remove the step frame, the pins are pulled back against their springs and the bushings are slid or turned in positions with apertures 50 out of registry with the pins. The pins may then be released and the bushings slid out of apertures 32 and the step frame lifted off the step axle. The operation is done on the incline of the stairway where there is no upthrust track for the trailer wheels, so that the step can be completely removed. To facilitate removal of the steps, the frames of certain ones of the steps are provided with openings 55 in the plates 10 to afford access to the pins. Also openings 56 are provided in the side members 13 of the frame for this purpose. The step treads are secured to the frame as by screws 57, these step treads being first removed to provide access to the openings 55. In case it is desired to remove a step whose frame is not provided with openings, a step whose frame has openings is removed first to allow access to the particular step by removing intervening steps.

It is to be noted that the pin 40 is retained with the step frame when the step is removed thereby obviating the possibility of the pins dropping out of their apertures and becoming lost. Furthermore, this facilitates reinstalling the step frames inasmuch as by pulling the pins back, the bushings may be inserted in apertures 32 whereupon the pins are released and are inserted by the springs in apertures 50 when these apertures come in registration with the pins.

It is to be understood that the above described arrangement is subject to various modifications. For example in the arrangement shown in Figures 4 and 5, a bolt 60 is utilized instead of a spring pressed pin. This bolt is slidable in apertures 61 and 62 in the bracket 30 and also is slidable into aperture 63 in bushing 33. A self-locking nut 64 is threaded on the bolt between the flanges 43 and 44 of the bracket. One side of the nut has a close fit with the bracket so as to prevent the nut turning when the bolt is rotated, thereby causing the nut to travel back and forth on the bolt when the bolt is taken up on or released. To mount the step frame on the step axle, each of the bolts is in the position illustrated in Figure 5. In this position the end of the bolt is clear of the bushing so that the bushing may be slid into position. The bolt is then turned in a direction to draw it inwardly, the bushing at the same time being turned until the aperture 63 registers with the aperture 61 in flange 43. Continued turning of the bolt after this registration is effected causes the end of the bolt to be inserted in aperture 63 and finally the bolt clamps the flange 44 between the head of the bolt and the nut. This locks the bolt in bushing retaining position, it being noted as shown in Figure 4 that there is clearance between the end of the bolt and the step axle with the bolt in this position. To remove the step from the step axle, each bolt is turned back to permit it to be pulled out into positon shown in Figure 5 whereupon the bushings may be slid aside and the step frame lifted off the axle. It is to be noted that the turning of the bolt is brought to a stop when the nut engages a pin 66 in the bolt. Thus the bolts are retained with the step frames when the step frames are removed, thereby facilitating the removal and replacement of the steps.

In Figure 6 a construction is shown for installations in which the step axle is clamped to the step frame to prevent relative rotation of the axle with respect to the frame, the lug and slot connection 26 being omitted to enable the axle to turn with respect to the chain. In this arrangement the bolt 70 is elongated so that when the bolt is taken up the end clamps against the step axle before the head of the bolt engages flange 44.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a moving stairway in which the steps are provided with step axles extending through the running gear chains, each step having a step frame, a pair of bushings on the step axle for each step, one for each side of the step frame, a bracket on each side of the step frame provided with an aperture for the bushing for that side of the step frame and having an opening extending from the edge of the bracket to the bushing aperture smaller than the bushing aperture but large enough to permit the step axle to enter the bushing aperture, thereby enabling the step to be secured to the running gear chains by mounting the step frame on the axle with the bushings slid aside on the axle so that the axle may enter the bushing apertures through said openings whereupon the bushings are slid into the bushing apertures, and also enabling the step to be removed by sliding the bushings on the axle out of the bushing apertures so that the step can be lifted off the step axle with the axle emerging through said openings, means carried by each bracket for retaining the bushing in position in the bushing aperture, said retaining means being slidable in said bracket toward and away from the bushing and the bushing being provided with means to receive said slidable means when the bushing is in place in said aperture to prevent movement of the bushing on the axle, and means for each retaining means for holding the retaining means in retaining position and for retaining it with the bracket when the bushing is removed.

2. In a moving stairway in which the steps are provided with step axles extending through the running gear chains, each step having a step frame, a pair of bushings on the step axle for each step, one for each side of the step frame, a pair of brackets secured to the step frame, one on each side thereof, each bracket being provided with an aperture for the bushing for that side of the step frame, having a flange around said aperture and having an opening extending from the edge of the bracket through said flange to the bushing aperture, said opening being smaller than the bushing aperture but large enough to permit the step axle to enter the bushing aperture, thereby enabling the step to be secured to the running gear chains by mounting the step frame on the axle with the bushings slid aside on the axle so that the axle may enter the bushing apertures through said openings whereupon the bushings are slid into the bushing aperture, and also enabling the step to be removed by sliding the bushings on the axle out of the bushing apertures so that the step can be lifted off the step axle with the axle emerging through said openings, each bracket being formed with an additional flange spaced from the aperture flange but coextensive therewith, a pin carried by each bracket for retaining the bushing in position in the bushing aperture, the flanges of the bracket being provided with aligned apertures in which the pin is slidably mounted and the bushing being provided with an opening to receive the end of said pin when the bushing is in place in said bushing aperture to prevent sidewise movement of the bushing on the axle, releasable means for holding each pin in retaining position, and means for retaining each pin in said apertures in the bracket flanges when the bushing is removed.

3. In a moving stairway in which the steps are provided with step axles extending through the running gear chains, each step having a step frame, a pair of bushings on the step axle for each step, one for each side of the step frame, a pair of brackets secured to the step frame, one on each side thereof, each bracket being provided with an aperture for the bushing for that side of the step frame, having a flange around said aperture and having an opening extending from the edge of the bracket through said flange to the bushing aperture, said opening being smaller than the bushing aperture but large enough to permit the step axle to enter the bushing aperture, thereby enabling the step to be secured to the running gear chains by mounting the step frame on the axle with the bushings slid aside on the axle so that the axle may enter the bushing apertures through said openings whereupon the bushings are slid into the bushing aperture, and also enabling the step to be removed by sliding the bushings on the axle out of the bushing apertures so that the step can be lifted off the step axle with the axle emerging through said openings, each bracket being formed with an additional flange spaced from the aperture flange but coextensive therewith, a pin carried by each bracket for retaining the bushing in position in the bushing aperture, the flanges of the bracket being provided with aligned apertures in which the pin is slidably mounted and the bushing being provided with an aperture to receive the end of said pin when the bushing is in place in said bushing aperture to prevent sidewise movement of the bushing on the axle, a head on each pin outside said additional flange, an abutment on each pin between said flanges, and a compression spring on each pin between said abutment and additional flange for holding said pin in the aperture in said bushing but yielding to permit the pin to be withdrawn from said aperture in said bushing for freeing said bushing.

4. In a moving stairway in which the steps are provided with step axles extending through the running gear chains, each step having a step frame, a pair of bushings on the step axle for each step, one for each side of the step frame, a pair of brackets secured to the step frame, one on each side thereof, each bracket being provided with an aperture for the bushing for that side of the step frame, having a flange around said aperture and having an opening extending from the edge of the bracket through said flange to the bushing aperture, said opening being smaller than the bushing aperture but large enough to permit the step axle to enter the bushing aperture, thereby enabling the step to be secured to the running gear chains by mounting the step frame on the axle with the bushings slid aside on the axle so that the axle may enter the bushing apertures through said openings whereupon the bushings are slid into the bushing aperture, and also enabling the step to be removed by sliding the bushings on the axle out of the bushing apertures so that the step can be lifted off the step axle with the axle emerging through said openings, each bracket being formed with an additional flange spaced from the aperture flange but coextensive therewith, a bolt carried by each bracket for retaining the bushing in position in the bushing aperture, the flanges of the bracket being provided with aligned apertures in which the bolt is slidably mounted and the bushing being provided with an aperture to receive the end of said bolt when the bushing is in place in said bushing aperture to prevent sidewise movement of the bushing on the axle, the bolt being mounted so that its head is outside said additional flange, a nut threaded on each bolt between said flanges, and a pin in each bolt between said nut and said bushing aperture flange for retaining said nut on said bolt, said brackets acting to prevent turning of said nuts upon turning of said bolts to enable said bolts by turning to be locked in bushing retaining positions or to be retracted to positions releasing the bushings.

SAMUEL GUSTAVE MARGLES.